United States Patent
Isoyama

(10) Patent No.: US 8,126,611 B2
(45) Date of Patent: Feb. 28, 2012

(54) ON-VEHICLE COMMUNICATION SYSTEM

(75) Inventor: Yoshikazu Isoyama, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 443 days.

(21) Appl. No.: 12/449,717

(22) PCT Filed: Feb. 27, 2008

(86) PCT No.: PCT/JP2008/053369
§ 371 (c)(1),
(2), (4) Date: Aug. 24, 2009

(87) PCT Pub. No.: WO2008/114583
PCT Pub. Date: Sep. 25, 2008

(65) Prior Publication Data
US 2010/0114403 A1 May 6, 2010

(30) Foreign Application Priority Data

Mar. 16, 2007 (JP) .................................. 2007-069072

(51) Int. Cl.
*G06F 19/00* (2006.01)
(52) U.S. Cl. .............................. 701/36; 701/33; 370/392
(58) Field of Classification Search .......... 701/1, 29–36; 370/401–408, 392, 398, 464–469, 395.5
See application file for complete search history.

(56) References Cited

U.S. PATENT DOCUMENTS

| | | | |
|---|---|---|---|
| 6,430,164 B1 * | 8/2002 | Jones et al. | 370/313 |
| 6,553,039 B1 * | 4/2003 | Huber et al. | 370/466 |
| 6,628,653 B1 * | 9/2003 | Salim | 370/389 |
| 2002/0003781 A1 | 1/2002 | Kikkawa et al. | |

FOREIGN PATENT DOCUMENTS

| | | |
|---|---|---|
| JP | A-2002-26924 | 1/2002 |
| JP | A-2002-176430 | 6/2002 |
| JP | A-2003-264571 | 9/2003 |
| JP | A-2006-319540 | 11/2006 |

\* cited by examiner

*Primary Examiner* — Richard M. Camby
(74) *Attorney, Agent, or Firm* — Oliff & Berridge, PLC

(57) ABSTRACT

An on-vehicle communication system has a plurality of buses relay-connected through a relay connection unit, each of the buses having at least one ECU connected thereto. In the vehicle communication system, a basic routing table that specifies a relay point for transmitting from the relay connection unit to the ECU is stored in a ROM and a transmission list report message about message IDs is transmitted. The ECU receives the transmission list report message and sends back a transmission request message about a message ID, which is not included in the transmission list report message but should be received, to the relay connection unit. The transmission request message is received by a table creation unit in the relay connection unit. The table creation unit creates a new additional routing table indicating a correspondence relationship between an ID requested by the transmission request message and a transmission destination and being stored in a RAM.

7 Claims, 6 Drawing Sheets

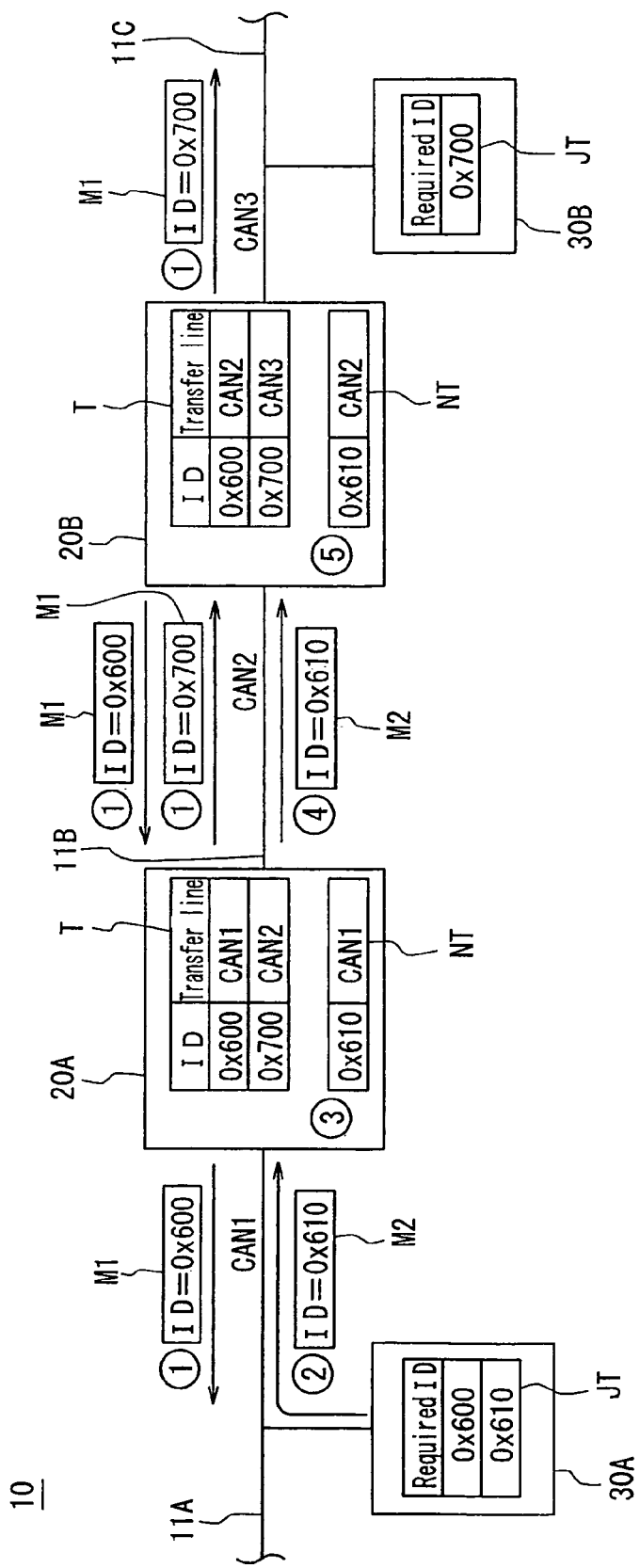

ON-VEHICLE COMMUNICATION SYSTEM

TECHNICAL FIELD

The present invention relates to a communication system to be mounted on a car. More particularly in the communication system, a communication line through which a message is to be sent is managed by a relay connection unit relaying a plurality of buses and connecting them to each other. Further in the communication system, when messages to be relayed are added, automatic processing can be executed inside the relay connection unit without the need for creating a program and incorporating it in the relay connection unit.

BACKGROUND ART

The communication system to be mounted on a car is conventionally adopted in which communication lines (hereinafter referred to as bus) connected to electronic control units (ECU: Electronic Control Unit) controlling the operation of appliances mounted on the car are connected with a relay connection unit such as a gateway to send and receive messages among the ECUs.

In recent years, with an increase in the function of the car, the number of the ECUs has increased and the number of messages to be sent and received among the ECUs has rapidly increased. Therefore to relay messages among the ECUs, the relay connection unit (so-called gateway) is interposed between buses connecting the ECUs to each other to efficiently send and receive the messages among the ECUs and decrease a communication load factor.

For example, as disclosed in Japanese Patent Application Laid-Open No. 2003-264571 (patent document 1), inside the ROM, there is provided the list routing table storing the correlation between the ID (identifier) of a message to be relayed to the relay connection unit and the bus through which the message is to be sent. With reference to the routing table, the message is relayed to the bus through which the message is to be sent, but is not relayed to other buses to decrease the communication load factor.

Patent document: Japanese Patent Application Laid-Open No. 2002-176430

DISCLOSURE OF THE INVENTION

Problem to be Solved by the Invention

But the ROM storing the routing table is incorporated in the relay connection unit as a program when the relay connection unit is produced. The message ID and the bus through which the message is to be sent are specified in advance. Therefore when an ECU desires to receive the message, supposing that the ECU is newly connected to a bus through which the message is not to be sent and that the function of the ECU is added, the ECU is incapable of receiving information from the relay connection unit because the data of these alterations and additions are not specified in the routing table stored in the ROM for which re-writing cannot be executed. That is, it is impossible to alter the communication system, add messages, and share the communication system with other kinds of cars.

To solve the above-described problems, it is conceivable to replace the existing ROM with a ROM having a new program to which compliance with added transmission and reception is added and incorporate the ROM in the relay connection unit. But in the relay connection unit to be mounted on a car, it is unpreferable to replace the ROM from the standpoint of reliability.

In a communication system other than that of the car, various kinds of communication appliances are used. Thus the IDs of messages necessary for the communication appliances are often different from one another. Therefore in information sent and received via the relay connection unit, the amount of information added later is apt to be larger than that of information stored in the ROM. Therefore in setting ID information when an apparatus having communication appliances mounted thereon is actuated, a lot of messages is collectively sent and received via communication lines. Thus the communication system has a problem that the communication load factor is high and it takes much time to create the table.

The present invention has been made in view of the above-described problems. It is an object of the present invention to provide a communication system, to be mounted on a car, in which when an ECU requests to receive a message via a bus through which a message is not sent, by using a basic routing table stored in a ROM incorporated in a relay connection unit when the relay connection unit is produced, addition of a routing table can be automatically made in the relay connection unit without the need of replacing an existing ROM with a new ROM storing an added routing table to thereby allow the communication system to be altered and shared with other kinds of cars.

Means for Solving the Problem

To solve the above-described problem, the present invention provides a communication system to be mounted on a car, wherein a plurality of buses is connected to each other via a relay connection unit, and at least one electronic control unit is connected to each of the buses. The relay connection unit has a storage section having a ROM storing a basic routing table indicating a correlation between a message ID (identifier) to be relayed and a bus through which the message is to be sent and a RAM storing a rewritten additional routing table indicating a newly added correlation therebetween; a message creation section creating a transmission list report message indicating a correlation between the message ID (identifier) to be relayed and the bus through which the message is to be sent based on the basic routing table of the storage section and the additional routing table thereof; and a table creation section creating the additional routing table to be stored in the RAM.

The relay connection unit sends the transmission list report message to all of the buses connected thereto. The electronic control unit which has received the transmission list report message via the bus sends a transmission request message of a message ID, of necessary messages ID, which the electronic control unit has not received to the relay connection unit. At the table creation section of the relay connection unit, the relay connection unit which has received the transmission request message creates a new routing table, of an added message, indicating a correlation between the message ID requested by the transmission request message and the bus, through which the message is to be sent, connected to the electronic control unit which has sent the transmission request message and stores the new routing table by rewriting the RAM.

The communication system to be mounted on a car has been constructed based on the characteristic of a communication appliance to be mounted on a car.

In a communication system other than that of the car, various kinds of communication appliances are connected to the relay connection unit. In the case of the car, the communication appliance to be connected to the relay connection unit is assumed as an option in advance. There are very few cases where a new kind of a communication appliance is connected to the relay connection unit.

Therefore it is possible to assume the kind of the bus which connects the optional communication appliance and the relay connection unit to each other. It is also possible to assume the correlation between the bus and the ID of the message sent and received by relaying it via the relay connection unit. Based on the characteristic of the communication system for the car, the basic routing table of the ROM is created inclusively of the optional communication appliance. That is, the basic routing table to be stored in the ROM beforehand stores the above-described correlation including an assumable option. Thus the number of the additional routing tables which are added and stored by rewriting the RAM is very few.

Because the message IDs required by the communication appliance can be mostly assumed and are stored in the basic routing table of the ROM, only a small amount of messages is sent and received in setting additional message IDs when the communication system is actuated. Therefore it is possible to prevent communication from congesting and execute communication processing in a short period of time.

The buses connected to the electronic control unit and the relay connection unit are composed of a CAN communication line respectively.

The message received by the relay connection unit via the bus is relayed to a corresponding bus with reference to the routing table stored in the storage section. Therefore in a case where a bus of other communication system not stored in the routing table of the storage section is connected to the relay connection unit, in a case where a new electronic control unit is connected to the bus already connected to the relay connection unit, and in a case where the function of the electronic control unit already connected to the bus is added, it is impossible to receive the transmission of the message from the relay connection unit because the correlation between the message ID and the bus of these cases are not described in the routing table.

In the communication system of the present invention to be mounted on a car, the transmission list report message is sent to all the buses connected to the relay connection unit. Therefore the transmission list report message is also sent to the bus newly connected to the relay connection unit. Thus the electronic control unit connected to the added bus is capable of receiving the transmission list report message.

Based on the received transmission list report message, the added electronic control unit selects a message ID it desires to receive and sends the transmission request message to the relay connection unit via the bus.

The relay connection unit which has received the transmission request message is capable of learning the message ID which has become necessary to be newly sent and the bus connected with the electronic control unit which has sent the transmission request message thereto, creates the correlation between the message ID and the bus through which the message is to be sent at the table creation section thereof, and stores the created additional routing table by rewriting the RAM.

With reference to the additional routing table newly stored in the RAM, the relay connection unit sends the ID of the message which has become necessary to be newly sent to the corresponding bus. The added electronic control unit connected to the corresponding bus is capable of receiving the necessary message.

Similar processing is executed in any of the above-described cases in which the bus is newly connected to the relay connection unit, the electronic control unit is newly connected to the bus already connected to the relay connection unit, and the function of the electronic control unit already connected to the bus is added. That is, the electronic control unit receives the transmission list report message from the relay connection unit, and a request of the transmission of the necessary message ID which has not been received thereby is sent to the relay connection unit. Thereby the relay connection unit creates the additional routing table at the table creation section thereof and rewrites the RAM. In this manner, it is possible to add the message ID and the bus through which the message is to be sent.

Therefore it is unnecessary to incorporate the ROM storing a program altered by addition in the relay connection unit and possible to cope with the addition by rewriting the RAM. Therefore it is possible to enhance versatility of the communication system and use the relay connection unit for communication systems of other kinds of cars.

The transmission list report message sent from the relay connection unit is created with reference to both the basic routing table stored in the ROM and the additional routing table already written to the RAM.

As described above, because the transmission list report message sent from the relay connection unit is created with reference to both the basic routing table stored in the ROM and the additional routing table stored in the RAM, it is possible to decrease the amount of transmission request messages to be sent from the electronic control unit.

The transmission list report message M1 includes the ID of the message to be sent and a data length.

By including not only the message ID and the data length in the transmission list report message, the electronic control unit which has received the transmission list report message is capable of learning alteration of the message sent from the relay connection unit and judging whether it is necessary to request the transmission of the transmission request message thereto.

The electronic control unit has: a storage section storing a reception list table indicating a message ID to be received; a comparison section comparing the transmission list report message and the reception list table with each other and detecting a message ID included in the reception list table but not included in the transmission list report message; and a message creation section creating the transmission request message of only the message ID detected by the comparison section. The electronic control unit sends the transmission request message created at the message creation section thereof to the relay connection unit.

As described above, the message which has been sent to the bus connected to the electronic control unit is excluded from transmission request messages to be sent from the electronic control units to the relay connection unit. Therefore it is possible to decrease the amount of the transmission request message and not to increase the communication load factor. Further the relay connection unit is capable of shortening the period of time required to create the additional routing table.

It is preferable that when the relay connection unit and the electronic control unit of the communication system to be mounted on a car are actuated by connecting the relay connection unit and the electronic control unit to a battery, the transmission list report message and the transmission request message are sent and received between the relay connection unit and the electronic control unit, and the processing of creating the additional routing table is executed by the relay connection unit.

In dependence on an appliance connected to the bus, the above-described processing may be executed when an off state of the car is switched to an accessory state or an on state by operating an ignition key of the car.

Effect of the Invention

As described above, in the present invention, the relay connection unit has the ROM storing the basic routing table and the RAM storing the rewritten additional routing table added in the relay of a message. The relay connection unit sends the transmission list report message to all the buses. When the electronic control unit connected to the bus sends only the message ID desired to be sent to the relay connection unit, based on the transmission list report message, the relay connection unit creates the additional routing table at the table creation section thereof and stores the additional routing table by rewriting it in the RAM.

Therefore in any of the above-described cases in which the bus is newly connected to the relay connection unit, the electronic control unit is newly connected to the bus already connected to the relay connection unit and the function of the electronic control unit already connected to the bus is added, the relay connection unit is capable of automatically sending the message to any of the electronic control units which desire to receive the message. Thus even when there is an addition in the relay of a message, it is unnecessary to replace the existing ROM with a ROM having a new basic routing table, but the RAM is capable of coping with the above-described situation. Therefore it is possible to accelerate sharing of the electronic control unit.

Particularly in the communication system of the present invention to be mounted on a car, the communication appliance to be optionally added can be assumed in advance. It is also possible to assume a message required by the electronic control unit of the communication appliance and the bus to be connected thereto. Therefore the relationship between the ID of the message and the bus can be stored in the basic routing table of the ROM in advance.

That is, the basic routing table of the ROM of the relay connection unit stores the correlation between the bus and the message ID sent and received between the relay connection unit and the electronic control unit, set as an optional appliance, which has not been connected to the relay connection unit via the bus but is assumed to be connected to the relay connection unit to decrease the number of the additional routing tables to be written to the RAM. Consequently based on the transmission list report message sent from the relay connection unit to all the buses when the car is actuated, it is possible to greatly reduce the number of the message IDs whose transmission is requested by the electronic control unit. Thereby it is possible to prevent communication from congesting when the car is actuated and execute communication processing for transmission request in a short period of time

BRIEF DESCRIPTION OF THE DRAWINGS

FIG. 7 shows a second embodiment of the present invention.

EXPLANATION OF REFERENCE NUMERALS AND SYMBOLS

Figure 1:
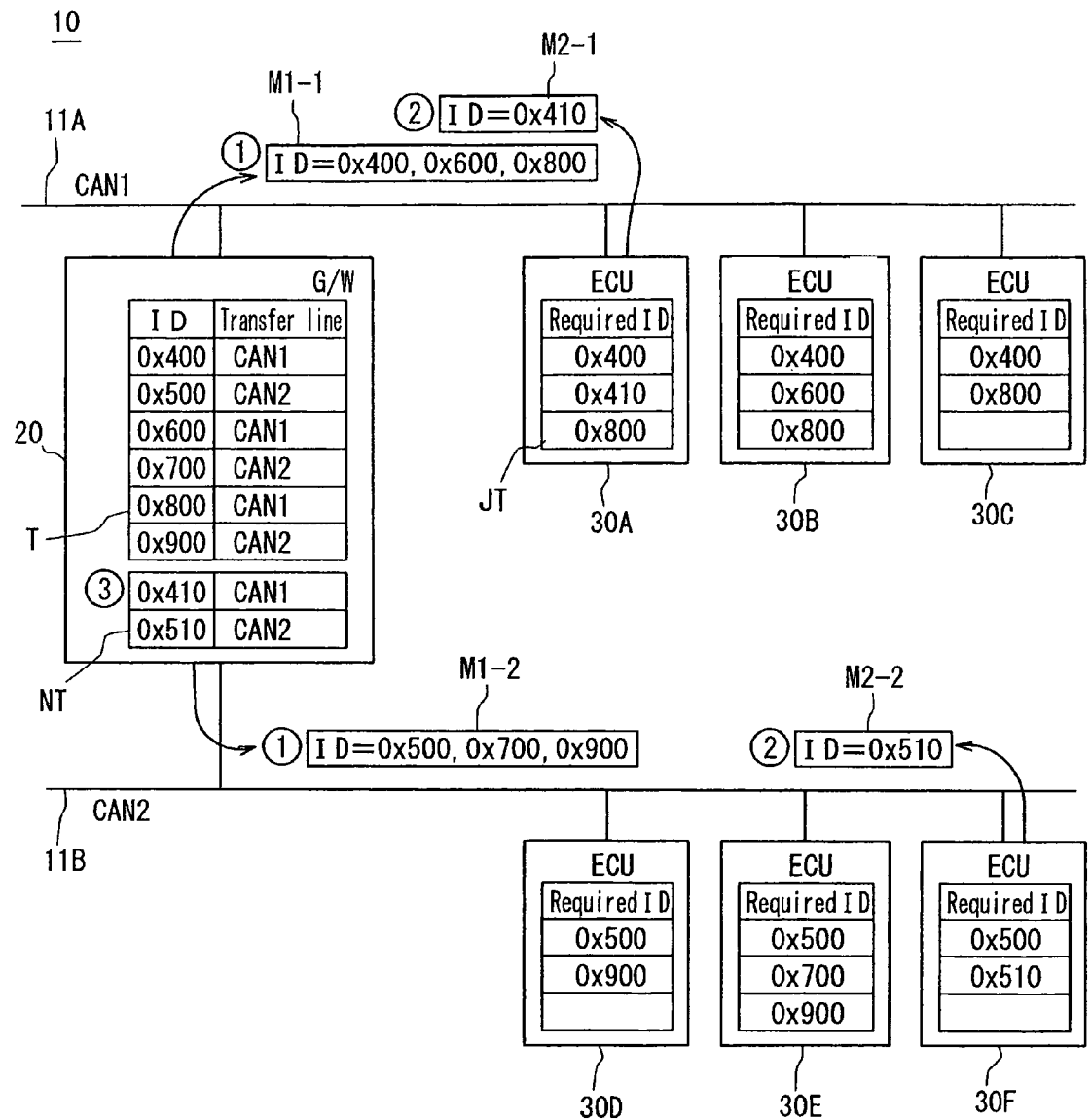
FIG. 1 shows a first embodiment of the present invention, thus showing an operation of a communication system to be mounted on a car when it is actuated after the design thereof is altered.

10: communication system to be mounted on a car
11: communication line
20: relay connection unit
22: CPU
23: ROM (storage section)
24: RAM
25: relay processing section
26: message creation section
27: table creation section
30: ECU (Electronic Control Unit)
32: CPU
33: ROM
34: comparison section
JT: reception list table
M: message
M1(M1-1, M1-2): transmission list report message
M2(M2-1, M2-2): transmission request message
T: basic routing table
NT: new routing table

BEST MODE FOR CARRYING OUT THE INVENTION

The embodiments of the present invention are described below with reference to the drawings.

FIGS. 1 through 6 show the first embodiment of the present invention.

In a communication system 10 to be mounted on a car (hereinafter referred to as communication system 10) of the first embodiment, communication lines (buses) 11A, 11B using CAN as its communication protocol are connected to each other via a relay connection unit (gateway) 20 to construct a communication network. A plurality of ECUs 30 (electronic control units) is connected to each of the communication lines 11A, 11B.

Figure 3:
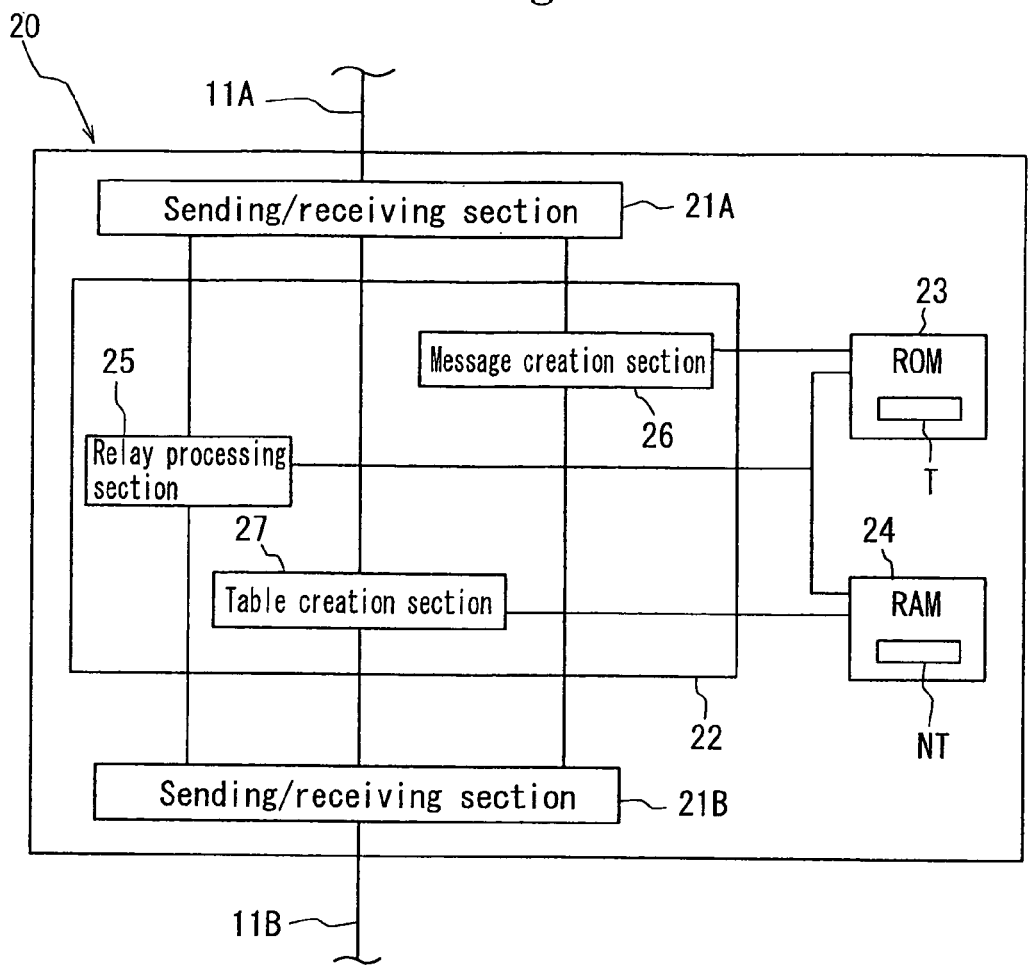
FIG. 3 is a block diagram of a relay connection unit.

As shown in FIG. 3, the relay connection unit 20 is connected to the communication lines 11A, 11B via sending/receiving sections 21A, 21B. The sending/receiving sections 21A, 21B are connected to a CPU 22. The CPU 22 is connected to a ROM 23 and a RAM 24 constructing a storage section.

The CPU 22 is connected to a basic routing table T stored in the read-only non-rewritable ROM 23 and to an additional routing table NT (both the basic routing table T and the additional routing table NT are hereinafter referred to as routing table) stored in the rewritable RAM 24.

The CPU 22 has a relay processing section 25 determining whether it is necessary to relay a message M and determining a communication line through which the message M is to be relayed with reference to the routing table, a message creation section 26 creating a transmission list report message M1 with reference to the routing table, and a table creation section 27 creating an additional routing table NT based on a transmission request message M2, described later, which is received from the ECU 30.

As described above, the ROM 23 of the storage section stores the basic routing table T created in a program incorporated in the relay connection unit 20 when the relay connection unit 20 is produced.

The basic routing table T to be stored in the ROM 23 beforehand stores a correlation between the bus and the ID of a message required by the electronic control unit, set as an optional communication appliance, which has not been connected to the relay connection unit 20 via the bus but is to be connected to the bus connected to the relay connection unit 20 or to the bus to be connected to the relay connection unit 20. Thereby it is possible to beforehand decrease the number of the routing tables to be newly added.

The additional routing table NT, created by the table creation section 27, which is to be newly added is rewritten and stored in the RAM 24.

Figure 4:
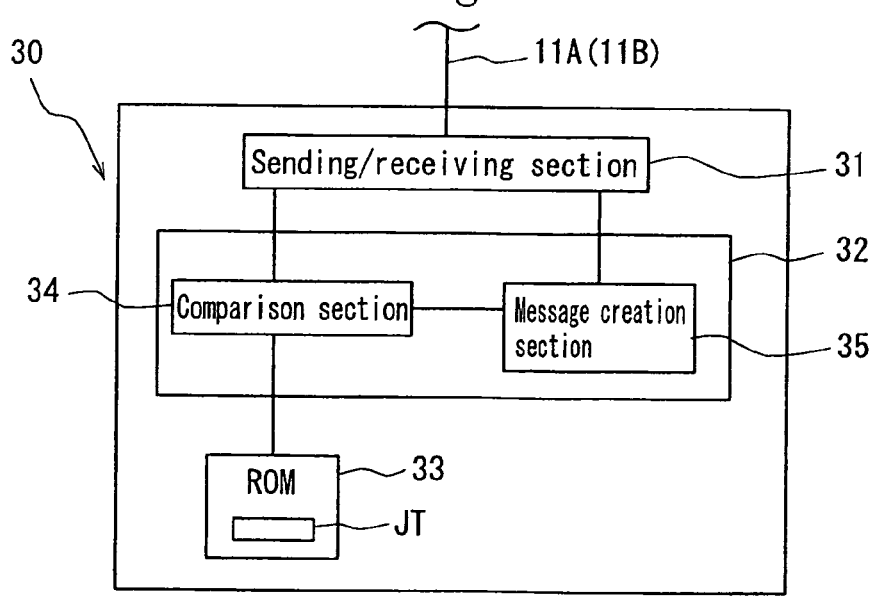
FIG. 4 is a block diagram of an ECU.

As shown in FIG. 4, the ECU 30 connected to all the communication lines (buses) connected to the relay connection unit 20 has a sending/receiving section 31 connected to the communication line 11A (11B), a CPU 32 executing necessary processing, and a storage section 33.

The CPU 32 has a comparison section 34 comparing the transmission list report message M1 sent from the relay connection unit 20 and a reception list table JT stored at the storage section 33 with each other and a message creation section 35 creating the transmission request message M2 based on a result detected by the comparison section 34. Appliances, switches, sensors, and the like to be controlled by the ECU 30 are connected thereto, but not shown in the drawings.

In detail, the ROM 23 of the storage section of the relay connection unit 20 stores the basic routing table T indicating the correlation between the ID (identifier) of the message M sent and received in the communication system 10 and a transmission line (CAN 1 at the side of the communication line 11A or CAN 2 at the side of the communication line 11B).

Figure 5A:
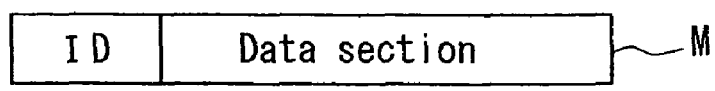
FIG. 5(A) schematically shows the format of a message.

As schematically shown in FIG. 5(A), the message M has the ID and a data section. When the sending/receiving sections 21A, 21B of the relay connection unit 20 receive the message M, with reference to the basic routing table T of the ROM 23, the relay processing section 25 of the CPU 22 relays the message M to a designated communication line 11A or the communication line 11B through which the message M is to be sent. When it is unnecessary to relay the message M, the relay processing section 25 does not relay it. When the relay processing section 25 of the CPU 22 relays the message M, it relays the message M to the communication lines 11A, 11B via the sending/receiving sections 21A, 21B. For example, the relay processing section 25 sends a message whose ID is "0x600" to the communication line 11A and a message whose ID is "0x700" to the communication line 11B.

When the RAM 24 stores the added and rewritten additional routing table NT which is described later, the relay processing section 25 executes relay processing with reference to both the basic routing table T of the ROM 23 and the additional routing table NT stored in the RAM 24.

Figure 5B:
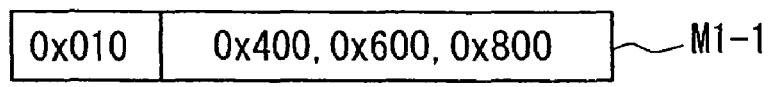
FIGS. 5(B), (C) show a transmission list report message.
Figure 5C:
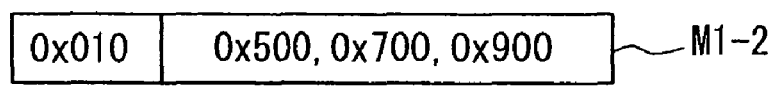
FIGS. 5(D), (E) show a transmission request message.
Figure 6:
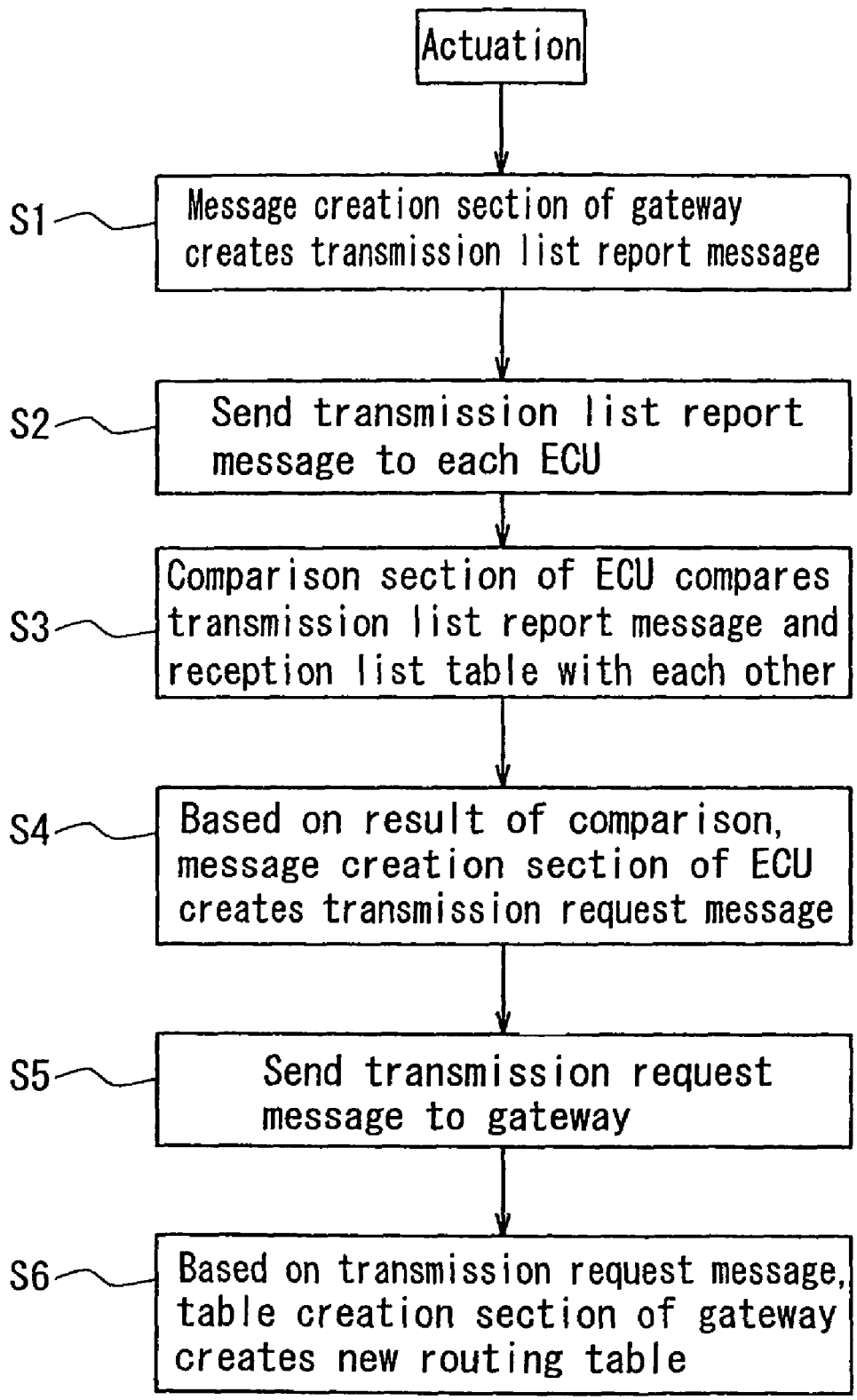
FIG. 6 is a flowchart showing an operation after the communication system to be mounted on a car is actuated.

When the additional routing table NT is stored in the RAM, with reference to the basic routing table T stored in the ROM 23 and the additional routing table NT, the message creation section 26 of the CPU 22 creates the transmission list report message M1 shown in FIGS. 5(B) and 5(C) (step S1 of FIG. 6).

The ID of a message to be sent is described at the data section as the transmission list report message M1. The ECU 30 which has received the transmission list report message M1 is capable of learning the content of the message is to be sent from the relay connection unit 20.

The procedure of creating the new additional routing table NT in the relay connection unit 20 is described below with reference to FIG. 6.

As described above, in the basic routing table T of the ROM 23, the correlation between an assumable message ID and the communication line (bus) through which the message is to be sent is beforehand stored to decrease the additional routing table NT to be rewritten at the RAM.

The transmission list report message M1 is sent to all the communication lines (communication lines 11A, 11B in the first embodiment) to which the relay connection unit 20 is connected (step S2 of FIG. 6).

When the sending/receiving section 31 of the ECU 30 receives the transmission list report message M1, the comparison section 34 of the ECU 30 compares an ID described at the data section of the transmission list report message M1 and the ID of the reception list table JT (stored in ROM 33) indicating the ID of the message to be received with each other, thus detecting an ID included in the reception list table JT but not included in the transmission list report message M1 (step S3 of FIG. 6).

Figure 5D:
Figure 5E:

Based on the result of the detection, the message creation section 35 of the CPU 32 creates the transmission request message M2, shown in FIGS. 5(D) and 5(E), which requests additional transmission and whose ID is described at the data section (step S4 of FIG. 6).

The ECU 30 sends the transmission request message M2 to the relay connection unit 20 (step S5 of FIG. 6).

When the sending/receiving sections 21A, 21B of the relay connection unit 20 receive the transmission request message M2, the table creation section 27 of the relay connection unit 20 creates the new additional routing table NT specifying the correlation between the ID of the message requesting the additional transmission and the communication line through which the message is to be sent by rewriting the RAM 24 (step S6 of FIG. 6).

After the new additional routing table NT is created, the relay processing section 25 of relay connection unit 20 executes relay processing with reference to both the basic routing table T stored in the ROM 23 and the new additional routing table NT stored in the RAM 24.

Figure 2:
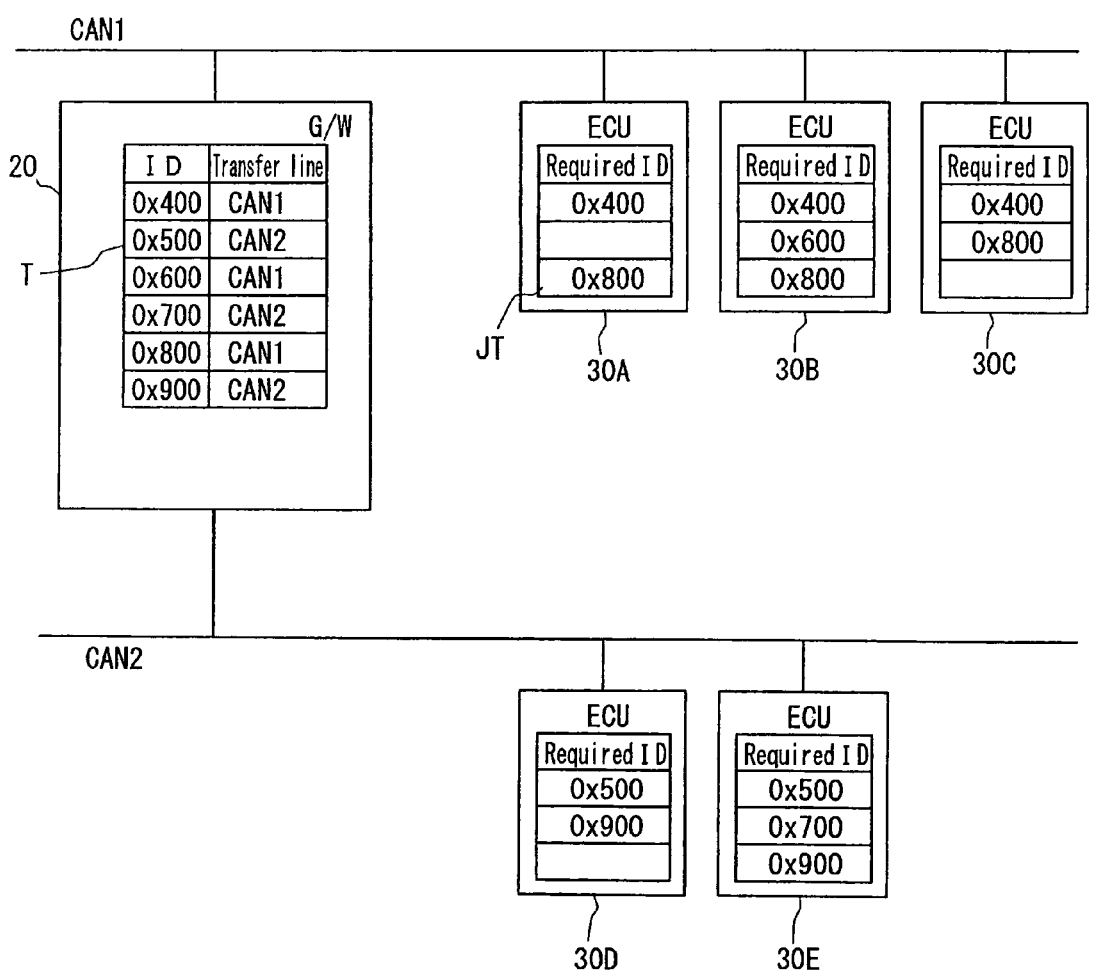
FIG. 2 shows a state before the design of the communication system to be mounted on a car is altered.

Next, a case in which the communication system 10 is altered from the state shown in FIG. 2 to the state shown in FIG. 1 is concretely described.

The number of appliances to be controlled by the ECU 30A is increased, and an ECU 30F is newly connected to the communication line 11B.

When the relay connection unit 20 and the ECU 30 of the communication system 10 are actuated by connecting them to a battery, with reference to the basic routing table T stored in the ROM 23, the message creation section 26 of the relay connection unit 20 creates transmission list report messages M1-1, M1-2 (step S1 of FIG. 6) shown in FIGS. 5(B) and 5(C) respectively.

At step S1, the additional routing table is not stored in the RAM.

The transmission list report message M1-1 is the message to be sent to the communication line 11A. ID "0x400" "0x600" "0x800" of the message to be sent to the communication line 11A is described at the data section of the transmission list report message M1-1. Thereby the ECUs 30A through 30C which have received the transmission list report message M1-1 are capable of learning that the message M having the ID "0x400" "0x600" or the ID "0x800" is to be sent from the relay connection unit 20.

Similarly the transmission list report message M1-2 is the message to be sent to the communication line 11B. ID "0x500" "0x700" "0x900" of the message to be sent to the communication line 11B is described at the data section of the transmission list report message M1-2. Thereby the ECUs 30D and 30E which have received the transmission list report message M1-2 are capable of learning that the message M having the ID "0x500" "0x700" or the ID "0x900" is to be sent from the relay connection unit 20.

ID "0x010" of the transmission list report messages M1-1 and M1-2 shown in FIGS. 5(B) and 5(C) respectively indicates the transmission list report message M1.

The transmission list report message M1 created by the message creation section 26 is transferred to the sending/receiving sections 21A, 21B. The transmission list report message M1-1 is sent to the communication line 11A, and the transmission list report message M1-2 is sent to the communication line 11B (step S2 of FIG. 6).

As shown in FIG. 1, the comparison section 34 of the ECU 30A which has the need of receiving a message having an ID "0x410" compares the ID "0x400" "0x600" "0x800" described at the data section of the transmission list report message M1-1 sent from the relay connection unit 20 with the ID "0x400" "0x410" "0x800" described in the reception list table JT (step S3 of FIG. 6). As a result of the comparison, an ID "0x410" included in the reception list table JT but not included in the transmission list report message M1 is detected. Based on the result of the detection, the message creation section 35 creates a transmission request message M2-1 (FIG. 5(D)) which requests additional transmission and whose ID "0x410" is described at the data section (step S4 of FIG. 6).

The comparison section 34 of the ECU 30F newly connected to the communication line 11B compares the ID "0x500" "0x700" "0x900" described at the data section of the transmission list report message M1-2 sent from the relay connection unit 20 with an ID "0x500" "0x510" described in the reception list table JT (step S3 of FIG. 6). As a result of this comparison, an ID "0x510" included in the reception list table JT but not included in the transmission list report message M1-2 is detected. Based on the result of the detection, the message creation section 35 creates a transmission request message M2-2 (FIG. 5(E)) which requests additional transmission and whose ID "0x510" is described at the data section (step S4 of FIG. 6).

The ID "0x100" described at the ID of the transmission request messages M2-1 and M2-2 shown in FIGS. 5(D) and 5(E) respectively indicates the transmission request message M2 created in the ECU 30 connected to the communication lines 11A, 11B.

When the relay connection unit 20 receives the transmission request messages M2-1, M2-2, shown in FIGS. 5(D) and 5(E) respectively, which have been sent from the ECUs 30A, 30F respectively (step S5 of FIG. 6), the table creation section 27 creates the new routing table NT indicating that the message having the ID "0x410" is sent to the communication line 11A and that the message having the ID "0x510" is sent to the communication line 11B (step S6 of FIG. 6). The new routing table NT is stored in the RAM 24.

After the new additional routing table NT is created, with reference to both the basic routing table T stored in the ROM 23 of the relay connection unit 20 and the new additional routing table NT stored in the RAM 24, the message having an ID "0x400, 0x410, 0x600, 0x800" is sent to the communication line 11A, and the message having an ID "0x500, 0x510, 0x700, 0x900" is sent to the communication line 11B.

As described above, when the ECU 30F is newly connected to the communication line 11B or the function of the ECU 30A is added, the new routing table NT is automatically created to allow the message to be relayed to the designated communication line with reference to the new routing table NT.

Each ECU 30 does not inform the relay connection unit 20 of all IDs of necessary messages, but inform the relay connection unit 20 of only the ID of a message whose relay line is not grasped by the relay connection unit 20. Therefore it is possible to decrease the amount of data to be sent and received between the relay connection unit 20 and the ECUs 30 which is necessary for creating the new routing table NT. It is also possible to create the new additional routing table NT in a short period of time.

FIG. 7 shows the second embodiment of the present invention.

In the communication system 10 of the second embodiment, the communication lines 11A and 11B are connected to each other via a first relay connection unit 20A, the communication lines 11B and 11C are connected to each other via a second relay connection unit 20B, and the ECUs 30A and 30B are connected to the communication lines 11A and 11C respectively. In the second embodiment, the relay connection unit 20 has also the message creation section creating the transmission request message M2.

The basic routing table T of the relay connection unit 20 and the reception list table JT of the ECU 30 are as shown in FIG. 7. When the communication system 10 is actuated, each of the relay connection units 20A, 20B creates the transmission list report message M1 at the message creation section thereof, thus sending it to the necessary communication line 11.

The transmission request message M2 requesting the transmission of the message having an ID "0x610" is created in the ECU 30A which has received the transmission list report message M1 and sent to the first relay connection unit 20A.

In the first relay connection unit 20A which has received the transmission request message M2, the new routing table NT is created. To inform the second relay connection unit 20B of the transmission request, the transmission request message M2 requesting the transmission of the message having the ID "0x610" is created at the message creation section of the first relay connection unit 20A and sent to the communication line 11B connected to the second relay connection unit 20B.

In the second relay connection unit 20B which has received the transmission request messages M2 sent from the first relay connection unit 20A, the new routing table NT indicating that the message having the ID "0x610" is sent to the communication line 11B is created.

In the communication system 10, having a plurality of the relay connection units 20, which has the above-described construction, it is possible to inform all of the relay connection units 20 of the ID of the message which has been newly requested to be transmitted. Thereby it is possible to send the message newly requested to be sent to an object ECU via a plurality of the relay connection units 20.

In the second embodiment, the entire communication system conforms to the standard of the CAN, but the entirety or a part of the communication system may conform to the standard of FlexRay.

Because other constructions of the second embodiment and the operation and effect thereof are similar to those of the first embodiment, the same parts of the second embodiment as those of the first embodiment are denoted by the same reference numerals and symbols as those of the first embodiment.

What is claimed is:

1. A communication system to be mounted on a car, wherein a plurality of buses is connected to each other via a relay connection unit, and at least one electronic control unit is connected to each of said buses, said relay connection unit has a storage section having a ROM storing a basic routing table indicating a correlation between a message ID (identifier) to be relayed and a bus through which said message is to be sent and a RAM storing a rewritten additional routing table indicating a newly added correlation therebetween;

a message creation section creating a transmission list report message indicating a correlation between said message ID (identifier) to be relayed and said bus through which said message is to be sent based on said basic routing table of said storage section and said additional routing table thereof; and a table creation section creating said additional routing table to be stored in said RAM, said relay connection unit sending said transmission list report message to all of said buses connected thereto;

said electronic control unit which has received said transmission list report message via said bus sends a transmission request message of a message ID, of necessary messages ID, which said electronic control unit has not received to said relay connection unit;

at said table creation section of said relay connection unit, said relay connection unit which has received said transmission request message creates a new routing table, of an added message, indicating a correlation between said message ID requested by said transmission request message and said bus, through which said message is to be sent, connected to said electronic control unit which has sent said transmission request message and stores said new routing table by rewriting said RAM.

2. The communication system to be mounted on a car according to claim 1, wherein said electronic control unit has:

a storage section storing a reception list table indicating a message ID to be received;

a comparison section comparing said transmission list report message and said reception list table with each other and detecting a message ID included in said reception list table but not included in said transmission list report message; and a message creation section creating said transmission request message of only said message ID detected by said comparison section, said electronic control unit sending said transmission request message created at said message creation section thereof to said relay connection unit.

3. The communication system to be mounted on a car according to claim 1, wherein said buses connected to said electronic control unit and said relay connection unit are composed of a CAN, communication line respectively.

4. The communication system to be mounted on a car according to claim 1, wherein said relay connection unit transmits said transmission list report message, and said electronic control unit transmits said transmission request message when said relay connection unit and said electronic control unit are connected to a battery.

5. The communication system to be mounted on a car according to claim 1, wherein said relay connection unit transmits said transmission list report message and said electronic control unit transmits said transmission request message when an off state of said car is switched to an accessory state or an on state by operating an ignition key of said car.

6. The communication system to be mounted on a car according to claim 1, wherein said basic routing table of said ROM of said relay connection unit stores a correlation between said bus and a message ID sent and received between said relay connection unit and said electronic control unit, set as an optional appliance, which has not been connected to said relay connection unit via said bus but is assumed to be connected to said relay connection unit to decrease a number of said additional routing tables to be written to said RAM.

7. The communication system to be mounted on a car according to claim 1, wherein said transmission list report message sent from said relay connection unit is created with reference to both said basic routing table stored in said ROM and said additional routing table already written to said RAM.

* * * * *